United States Patent [19]
Gosselin

[11] 3,876,172
[45] Apr. 8, 1975

[54] DAMPING DEVICE FOR THE SUSPENSION OF A WASHING MACHINE AND WASHING MACHINES EQUIPPED WITH SUCH DEVICES

[75] Inventor: Michel André Maurice Gosselin, Poulainville, France

[73] Assignee: U.S. Philips Corporation, New York, N.Y.

[22] Filed: Aug. 6, 1973

[21] Appl. No.: 386,070

[30] Foreign Application Priority Data
Aug. 7, 1972   France .............................. 72.28442

[52] U.S. Cl. ................................................. 248/18
[51] Int. Cl. ............................................. F16f 15/00
[58] Field of Search ....................................... 248/18

[56] References Cited
UNITED STATES PATENTS
3,262,661   7/1966   Johnson et al. ........................ 248/18
3,373,961   3/1968   Long ..................................... 248/18

*Primary Examiner*—James C. Mitchell
*Attorney, Agent, or Firm*—Frank R. Trifari

[57] ABSTRACT

A damping device for a washing machine consisting of a plate which is fixed to the tub of the machine and of friction pads held in position at either side of the plate by a U-shaped spring member. The cross-piece of the U-shaped spring member is parallel to the plane of the friction plate, and is fixed to the frame of the machine either freely or with friction.

11 Claims, 11 Drawing Figures

DAMPING DEVICE FOR THE SUSPENSION OF A WASHING MACHINE AND WASHING MACHINES EQUIPPED WITH SUCH DEVICES

The invention relates to a damping device for the suspension of a washing machine, and more particularly of the tub-motor assembly, of the type which comprises a plate which is fixed to the tub and two friction pads which are supported by the free ends of a U-shaped spring member, the pads rubbing against either side of said plate, and also to washing machines equipped with such devices.

French Patent Application No. 2,027,928 describes a device for damping oscillations of a tub-motor assembly, which comprises two pads fixed to the free ends of a U-shaped spring member and a plate which is fixed to the tub of the machine, the two pads rubbing against either side of the plate. The plates are disposed in a plane which is perpendicular to the axis of the tub and at the longitudinal edges they are provided with flanges which hold the friction pads in position. The legs of the U-shaped spring member are located in a plane which is parallel to the axis of the tub and the cross-piece is fixed to the base of the machine by a bearing bush which allows movement of the legs in planes parallel to the plane of the plate. The movement of the tub is damped by a braking system which is independent of the amplitude and the frequency of the oscillations. Such a damping system is unlikely to be sufficiently effective in case of dynamic unbalance, i.e., one which causes the tub to pivot about a vertical axis in the center of the machine, in which case the tub might act on the U-shaped springs and transmit a force to the frame through the shaft by which it is fixed to the latter in the longitudinal direction, thus causing instability of the machine. A damping which is proportional to the frequency and amplitude will be obtained only for forces whose direction is parallel to the drum axis, i.e., the very direction in which these undesired effects are unlikely to occur.

The damping device according to the invention limits the amplitude of the washing machine during the occurrence of the critical speeds (critical speed $\Omega = \sqrt{K/M}$, where $K$ = elasticity of the system, $M$ = moving mass) and compared with known systems it has the advantage that it allows the suspended tub to oscillate freely, without any undesired force, in all directions:

from front to rear and from top to bottom at the friction pads according to the invention.

from left to right (perpendicular to the tube axis) and vice versa to the frame of the machine, owing to the hinged connection of the cross-piece of the U-shaped spring member.

Moreover, the device is an inexpensive assembly because its components can be obtained by molding from a plastic material or can be simply formed from a semi-finished metallic material.

According to the invention the damping device for the suspension of a washing machine, and more particularly of the tub-motor assembly is, of the type which comprises a plate which is fixed to the tub and two friction pads which are secured to the free ends of a U-shaped spring member, said pads rubbing against either side of the plate and the U-shaped spring member being connected to the frame of the machine by its cross-piece, wherein the U-shaped spring member is twisted in such a way that the cross-piece of the U-shaped member and the free ends of the legs which carry the pads are located in planes which are perpendicular to each other, the plane which is defined by the plate which is fixed to the tub and the cross-piece then being parallel to one another.

In a preferred embodiment of the invention, the spring member is provided with two parts at its free ends which point towards the inside of the U-shaped member and which are in line.

The retaining device at the cylindrical cross-piece of the spring member consists of two parts of an elastic material which each form a semi-cylindrical channel, said channels being disposed one on either side of the cylindrical cross-piece, and of a piece of a rigid material which holds the channels of said parts of an elastic material against the cross-piece and which secures the two parts to the frame of the machine, the cross-piece rotating in the channels either with some friction or freely.

According to one feature of the invention the friction pads consist of three members: one hemispherical part, one intermediate part and a friction plate, the hemispherical part having a recess in the center of its plane surface which recess receives one of the free ends of the spring member, the intermediate part having a hemispherical recess in one face which recess receives the hemispherical part and having a recess in the other face to accommodate the friction plate. The hemispherical part is made of a polyformaldehyde monopolymer and the intermediate part of 6-6 polyamide.

In a different embodiment of the friction pads, the pads consist of three members: a cylindrical elastomer sleeve, a plastic intermediate part and a friction plate, the intermediate part being provided with a cylindrical recess in one face which recess receives the cylindrical sleeve, and in the other face with a recess to accommodate the friction plate, the intermediate piece being circularly symmetrical about the axis of the cylindrical recess.

In order to retain the friction pads on the free ends of the U-shaped spring member, the recess in the hemispherical part is provided with bosses on its cylindrical wall, the tops of the bosses defining a seating whose size is smaller than that of the free end of the spring member.

In one application of these damping devices in a washing machine two of these devices are used, each being located at either side of a vertical plane containing the axis of the drum of the machine.

In two other applications:

at least one of the plates fixed to the tub is located in a plane which is parallel to the drum axis.

at least one of the plates fixed to the tub is located in a plane which is perpendicular to the drum axis.

The following descriptions and drawings are given by way of example in order that the invention may be understood more fully.

Figure 1:
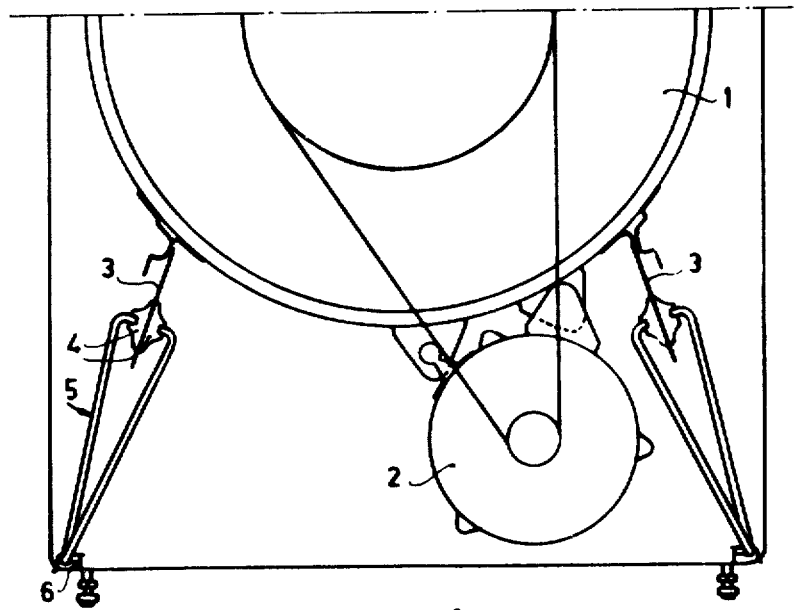
FIG. 1 is a rear view of a washing machine equipped with damping devices according to the invention.

FIG. 1 shows a washing machine equipped with damping devices according to the invention. In this example said devices are adapted to a tub of a washing machine with a horizontal shaft. The tub 1 and the motor assembly 2 are at the top suspended to the frame of the machine by means of springs (not shown) and are also held in place by damping devices, two in this example, the friction plates being located in planes which are parallel to the drum axis.

Figure 2:
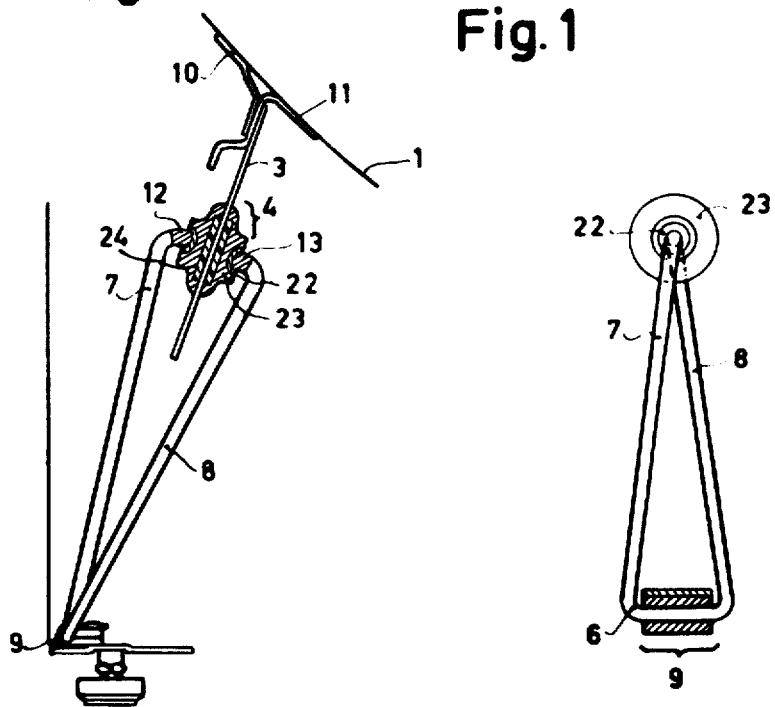
FIG. 2 is an enlarged sectional view of an embodiment of a damping device.

FIG. 2 shows an embodiment of the damping device. The friction plate 3 is fixed to the tub 1 by means of two angular sheet-metal plates 10 and 11 so as to obtain a rigid connection of the base of the plate 3 to the tub, because the vibrations should only be absorbed by the straight part of the plate. The plate is clamped between two identical pads 4 (to be described in more detail hereinafter) which are carried by the free ends of a U-shaped spring member 5. This U-shaped spring member is twisted in such a way that the cross-piece 6 of the U-member (FIG. 3) and the free ends of the legs 7 and 8 of the U-member which carry the pads 4 are located in planes which are perpendicular to each other, the plane defined by the plate 3 which is fixed to the tub and the cross-piece 6 thus being parallel. The free ends of the legs 7 and 8 of the spring member are provided with portions 12 and 13 which point towards the inside of the U-member and which are in line.

Figure 3:
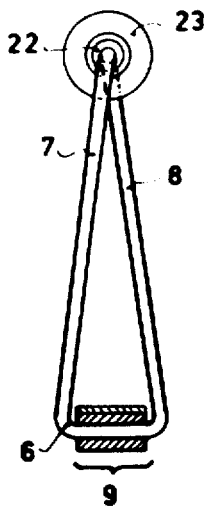
FIG. 3 is an oblique sectional view of the device according to FIG. 2 viewed in the plane of the plate which is fixed to the tub.
Figure 4:
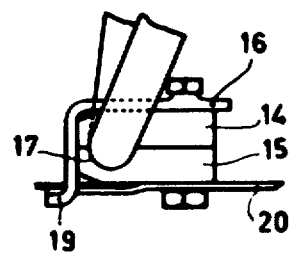
FIG. 4 is an enlarged side view of the device for retaining the spring member.
Figure 5:
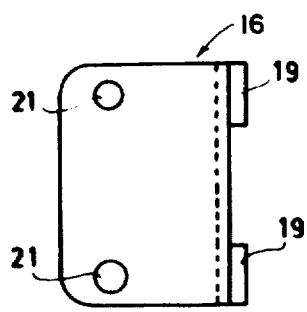
FIG. 5 is a top plan view of the part which retains and secures the two elastic pieces of the retaining device.
Figure 6:
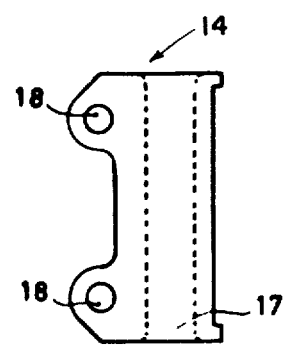
FIG. 6 is a top plan view of one of the elastic pieces forming the retaining device.

The U-shaped spring member is secured to the frame of the machine by its cross-piece 6 (FIG. 3) via a retaining device 9, which is shown on an enlarged scale in FIG. 4 and which consists of two pieces of an elastic material (plastic or elastomer) 14 and 15 each forming a semicylindrical channel 17. The pieces 14 and 15, which are identical and which are mounted symmetrically, are shown in FIG. 6. Holes 18 are provided for mounting to the frame. An angular piece 16 is bent and cut from sheet-steel and is provided (FIG. 5) with at least one portion 19 in the form of a tab which engages a slot provided in the sheet-steel chassis 20 of the machine frame. By means of two holes 21 of the same size as the holes 18 of the pieces 14 and 15 the assembly can be secured to the chassis 20 of the machine with the aid of bolts.

According to a first embodiment the channels of the pieces 14 and 15 form a cylindrical seating which allows free rotation of the cross-piece 6 of the spring member. The tub of the machine can thus move freely in a direction perpendicular to the cross-piece 6 of the spring member, damping being effected only by the friction pads 4 on the plate 3. Freedom of rotation is obtained by providing channels 17 whose depth is such that during assembly of the pieces 14 and 15 the diameter of the cylindrical cavity is greater than the diameter of the cross-piece 6. In one modification, the pieces 14 and 15 via the channels exert a frictional force on the cross-piece 6 of the spring member, allowing it to move while braking it. The diameter of the cylindrical cavity formed by the channels must then be smaller than the diameter of the cross-piece 6 of the spring member.

Figure 7A:
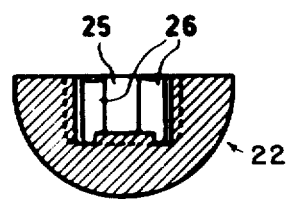
FIGS. 7a and 7b are a sectional view and a top plan view of the hemispherical part.
Figure 7B:
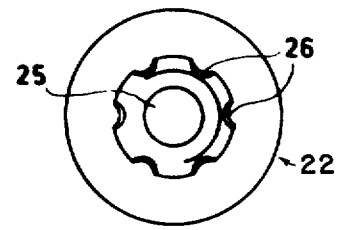
Figure 8:
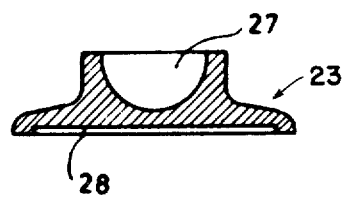
FIG. 8 is a sectional view of the intermediate part which cooperates with the hemispherical part.

In one embodiment of the invention friction pads are provided at the ends 12 and 13 (FIG. 2) of the spring member 5 (FIG. 1), said pads consisting of three members: a hemispherical part 22 (FIG. 2), which is shown in cross-section FIG. 7a and in top plan view in FIG. 7b, an intermediate part 23 (FIG. 2), which is shown in an enlarged scale in FIG. 8, and a friction plate 24 (FIG. 2). The hemispherical part shown in FIGS. 7a and 7b has a recess 25 in the center of its plane surface which receives one of the ends 12 or 13 of the spring member. To ensure that the hemispherical part is held in position at the end of the spring member, the recess 25 is provided with bosses 26 on its cylindrical wall which are uniformly distributed along the circumference. The tops of the bosses define a seating whose size is smaller than the size of the free end of the spring member. It is to be noted that the cross-section of the spring member need not be circular, it may equally be square, hexagonal or different, provided that the appropriate bosses are provided to retain the end of the spring member.

FIG. 8 shows the intermediate part one face of which is formed with hemispherical recess 27 of a diameter and depth corresponding to those of the hemispherical part (FIGS. 7a, 7b) with which it cooperates so as to form a pivot. The other face is formed with a recess 28 intended to receive the friction plate. Said intermediate part is circularly symmetrical about the axis of the hemispherical recess (FIG. 3).

The three parts forming the friction pads are mounted as shown in FIG. 2. The pivot formed by the parts 22 and 23 allows the plates 24 to remain in engagement with the plate 3 and thus to obtain a maximum damping effect irrespective of the inclination of the spring member.

The parts forming the friction pad are made of a plastic material except for the plate which consist of a composite material with a high coefficient of friction. In order to ensure that the pivot functions perfectly, the materials forming the hemisphere and the corresponding spherical cavity should have a minimal friction coefficient, as is for example the case with a polyformaldehyde monopolymer on 6-6 polyamide.

Figure 9:
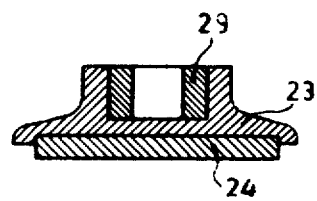
FIG. 9 shows a different embodiment of the friction pads.

FIG. 9 shows a sectional view of a friction shoe according to another embodiment which also consists of three members: a cylindrical hollow part or sleeve 29, an intermediate part 23 and a friction plate 24. In one face the intermediate part 23 is provided with a cylindrical bore in which the sleeve 29 fits. The elastomer sleeve accommodates one of the ends 12 or 13 of the spring member. The operation of the sleeve is similar to that of the pivot and because it is made of an elastomer, the pad is movable in all directions. The vibrations may produce a noise of varying intensity in the plates which is likely to be transmitted to the rest of the machine, but the use of a plastics or elastomer material for manufacturing the pads obivates said drawback.

The suspension damping devices may be incorporated in washing machines and more in particular in those having aa drum with a horizontal shaft. Several arrangements employing one or more devices can satisfy individual requirements.

The use of a single damping device is possible and may suffice. The device is then arranged either at one side of the machine or in the center of the machine. The arrangement of the friction plate with respect to the tub of the machine depends on the direction of the vibrations to be eliminated.

Figure 10:
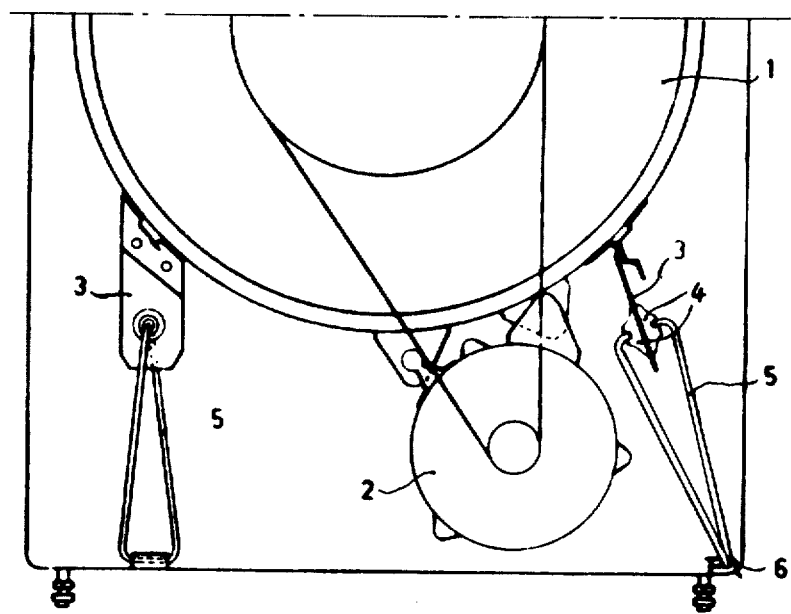
FIG. 10 is a rear view of a washing machine equipped, by way of example, with damping devices of which one friction plate is parallel to the tub axis and of which the other friction plate is perpendicular to said axis.

Generally, two damping devices are utilized and disposed one on either side of the vertical plane containing the drum axis. FIG. 1 shows a specific case in which the friction plates are located in planes which are parallel to the planes containing the drum axis. FIG. 10 shows another specific case in which one of the friction plates is disposed in a plane which is parallel to the drum axis, the other plate being disposed in a plane perpendicular thereto. As a damping device can move in all directions, the position of the plates is not of prime importance and acceptable results are still obtained when the damping devices are arranged in a random manner.

What is claimed is:

1. A device for damping the suspension of a washing machine, of the type which comprises a plate fixed to the tub and two friction pads attached to the free ends of a spring member, said pads rubbing against either side of the plate, wherein the spring member is U-shaped, having a cross-piece and two legs each having a free end, said spring being twisted such that the cross-piece and the free ends of the legs to which the pads are attached are located in planes which are perpendicular to each other, the cross-piece extending parallel to a plane defined by the plate.

2. A device as claimed in claim 1, wherein said cross-piece is cylindrical, said device further comprising means for retaining the cross-piece comprising two elastic parts of an elastic material each having a semi-cylindrical channel, said channels being arranged one at either side of said cross-piece in frictional contact therewith, and securing means for holding said elastic parts in said frictional contact position and for securing said elastic parts to a frame of a washing machine.

3. A device as claimed in claim 1, wherein said cross-piece is cylindrical, said device further comprising means for retaining the cross-piece comprising two elastic parts of an elastic material each having a semi-cylindrical channel, said channels being arranged one at either side of said cross piece, and a securing means for holding said elastic parts in position and for securing said elastic parts to a frame of a washing machine, such that said cross-piece can turn freely in said channels.

4. A device as claimed in claim 1, wherein said spring has a portion at each free end directed toward the inside of the U-shaped member, said portions being in line with each other.

5. A device as claimed in claim 4, wherein the friction pads comprise a hemispherical part, an intermediate part and a friction plate, the hemispherical part having a plane surface with a recess in the center of said surface for receiving one of the free ends of the spring member, the intermediate part having a face with a hemispherical recess for receiving said hemispherical part, and at a side opposite said face a recess for accommodating the friction plate.

6. A device as claimed in claim 5, wherein said hemispherical part is made of a polyformaldehyde monopolymer and said intermediate part is made of a 6-6 polyamide.

7. A device as claimed in claim 5, wherein the intermediate part is circularly symmetrical about the axis of the bore, the hemispherical part has bosses having tops, said bosses projecting from the cylindrical wall of the recess, the tops of the bosses defining a seat whose dimensions are smaller than those of the free end of the spring member.

8. A device as claimed in claim 4, wherein the friction pads comprise a cylindrical elastomer sleeve, a plastic intermediate part and a friction plate, the intermediate part having a face with a cylindrical bore in which the cylindrical sleeve is fitted, and an opposite face having a recess for accommodating the friction plate.

9. A washing machine of the type having a horizontal drum shaft, a tub, a plate fixed to the tub and two friction pads attached to the free ends of a spring member, said pads rubbing against either side of the plate, comprising a plurality of damping devices, at least one damping device being located on either side of a vertical plane which contains the axis of the drum of the machine, each damping device comprising a U-shaped spring member having a cross-piece and two legs each having a free end, said spring being twisted such that the cross-piece and the free ends of the legs to which the pads are attached are located in planes which are perpendicular to each other, the cross-piece extending parallel to a plane defined by the plate.

10. A machine as claimed in claim 9, wherein at least one plate fixed to the tub extends in a plane which is parallel to the drum axis.

11. A machine as claimed in claim 9, wherein at least one plate fixed to the tub extends in a plane which is perpendicular to the drum axis.

* * * * *